(12) United States Patent
Murphy

(10) Patent No.: US 9,194,537 B2
(45) Date of Patent: Nov. 24, 2015

(54) SYSTEM AND METHOD FOR STORAGE

(71) Applicant: Scott Murphy, Ostego, MN (US)

(72) Inventor: Scott Murphy, Ostego, MN (US)

(73) Assignee: Scott Murphy, Otsego, MN (US)

( * ) Notice: Subject to any disclaimer, the term of this patent is extended or adjusted under 35 U.S.C. 154(b) by 86 days.

(21) Appl. No.: 13/914,286

(22) Filed: Jun. 10, 2013

(65) Prior Publication Data

US 2013/0277403 A1    Oct. 24, 2013

Related U.S. Application Data

(60) Provisional application No. 61/657,520, filed on Jun. 8, 2012.

(51) Int. Cl.
| | | |
|---|---|---|
| *B60R 9/055* | (2006.01) | |
| *B65G 9/00* | (2006.01) | |
| *F16M 13/02* | (2006.01) | |
| *F16M 13/06* | (2006.01) | |
| *B65D 25/28* | (2006.01) | |
| *A47B 43/04* | (2006.01) | |
| *A47B 51/00* | (2006.01) | |

(52) U.S. Cl.
CPC ............. *F16M 13/022* (2013.01); *A47B 43/04* (2013.01); *A47B 51/00* (2013.01); *B65D 25/28* (2013.01); *F16M 13/06* (2013.01); *A47B 2051/005* (2013.01); *B60R 9/055* (2013.01); *B65G 9/008* (2013.01)

(58) Field of Classification Search
CPC ............. B60R 9/055; B66D 1/04; B65G 9/00
USPC ................. 224/328, 400, 309, 310, 314, 438; 294/68.1, 68.3, 67.1; 414/626, 496, 414/542, 572; 383/119, 107; 104/88.01, 91, 104/122, 127, 130.07; 212/336, 337; 198/347.1–347.4; 220/9.4
See application file for complete search history.

(56) References Cited

U.S. PATENT DOCUMENTS

| | | | | |
|---|---|---|---|---|
| 192,415 | A * | 6/1877 | Castleman | 212/91 |
| 1,846,542 | A * | 2/1932 | Budd | 383/15 |
| 2,621,836 | A * | 12/1952 | McMiller | 224/328 |
| 4,629,040 | A * | 12/1986 | Jones | 190/102 |
| 4,900,163 | A * | 2/1990 | Mack | 383/119 |
| 4,919,056 | A * | 4/1990 | Gronau | 104/130.07 |
| 5,086,888 | A * | 2/1992 | Chu | 190/107 |
| 5,096,107 | A * | 3/1992 | VanSon | 224/328 |
| 5,263,687 | A * | 11/1993 | Garbiso | 254/334 |
| 5,288,003 | A * | 2/1994 | MacDonald | 224/328 |
| 5,538,169 | A * | 7/1996 | Moore | 224/328 |
| 5,598,783 | A * | 2/1997 | Lund | 104/88.04 |
| 5,967,579 | A * | 10/1999 | Hebert | 294/74 |
| 6,068,095 | A * | 5/2000 | Glembocki et al. | 190/127 |

(Continued)

FOREIGN PATENT DOCUMENTS

| | | |
|---|---|---|
| DE | 3804364 C1 * | 5/1989 |
| DE | 3739121 A1 * | 6/1989 |

(Continued)

*Primary Examiner* — Justin Larson

(74) *Attorney, Agent, or Firm* — Billion & Armitage; Richard E. Billion

(57) ABSTRACT

A storage system includes a rail system, and a container. The container has an inner compartment. The container further includes an apparatus for supporting the container which also interacts the rail system, and a hoist coupled to the apparatus for supporting the container.

23 Claims, 15 Drawing Sheets

(56) References Cited

U.S. PATENT DOCUMENTS

| | | | | |
|---|---|---|---|---|
| 6,152,427 | A * | 11/2000 | Hoslett | 254/338 |
| 6,155,772 | A * | 12/2000 | Beale | 414/607 |
| 6,237,781 | B1 * | 5/2001 | Dahl | 211/17 |
| 6,257,470 | B1 * | 7/2001 | Schaefer | 224/318 |
| 6,386,515 | B1 * | 5/2002 | Sachtleben | 254/338 |
| 6,892,912 | B1 * | 5/2005 | MacNeil | 224/318 |
| 7,150,449 | B1 * | 12/2006 | Dueck et al. | 254/278 |
| 7,165,684 | B2 * | 1/2007 | Ferron | 211/19 |
| 7,896,206 | B2 * | 3/2011 | Myron et al. | 224/311 |
| D660,781 | S * | 5/2012 | Ruffino et al. | D12/414.1 |
| 2008/0152467 | A1 * | 6/2008 | Moritzhuber | 414/271 |
| 2011/0170996 | A1 * | 7/2011 | Vrijens | 414/542 |

FOREIGN PATENT DOCUMENTS

| | | | |
|---|---|---|---|
| DE | 4003053 | A1 * | 8/1991 |
| DE | 29621773 | U1 * | 2/1997 |
| WO | WO 03051758 | A1 * | 6/2003 |

* cited by examiner

US 9,194,537 B2

SYSTEM AND METHOD FOR STORAGE

RELATED APPLICATIONS

This application claims the benefit of U.S. Provisional Patent Application Ser. No. 61/657,520, filed on Jun. 8, 2012, which is incorporated by reference herein.

TECHNICAL FIELD

Various embodiments described herein relate to a system and a method for storage.

BACKGROUND

There always is a demand for more storage. Homeowners, for example, continue to want more space. Many new homes are built with three stall garages and in many instances the third stall quickly becomes a storage area. Homeowners are not the only ones seeking more storage. Businesses now also seek storage. This need for storage has given rise to an entire industry called the self-service storage industry. Amazingly, the self-storage industry has been one of the fastest-growing sectors of the United States commercial real estate industry over the period of the last 35 years. This has grown from a "Mom and Pop" industry in the 1950's to an industry with approximately 46,500 "primary" self-storage facilities in the United States as of year-end 2009, according to the US Census Bureau. Primary U.S. self-storage facility gross revenues for 2010 were approximately $22.0 billion for a national average (mean) of $444,000 per facility or national average (mean) of $9.52 of gross annual revenue per rentable sq. ft. The industry continues to grow. In 1995 approximately 6% of US households rented self-storage units. This number jumped to nearly 1 in 10 US households (HH), or 10% (10.8 million of the 113.3 million US households) that currently rent a self-storage unit. Put another way, there has been an increase of approximately 65 percent in the last 15 years.

Given the increased demand for storage, and a weakened economy, the consumer is interested in home storage. Home storage is easier on the budget since one must rent a self-storage unit. Home storage is also more convenient since the consumer does not have to drive to a remote site to get something out of storage.

SUMMARY OF THE INVENTION

A storage system includes a rail system, and a container. The container has an inner compartment. The container further includes an apparatus for supporting the container which also interacts with the rail system, and a hoist coupled to the apparatus for supporting the container. The hoist allows the container to be controllably positioned with respect to the apparatus for supporting the container. The container can also include a frame, a floor, and a plurality of fabric sides.

A storage container includes a frame, a floor positioned within the frame, a plurality of side flaps that cover the frame to form an inner compartment, an apparatus for supporting the container. The hoist allows the frame to move with respect to the support apparatus. The floor, in one embodiment, is comprised of a plurality of plank members. In still another embodiment, the plurality of plank members interlock with one another. In still another embodiment, the floor includes a single, solid plank member.

DETAILED DESCRIPTION

Figure 1:
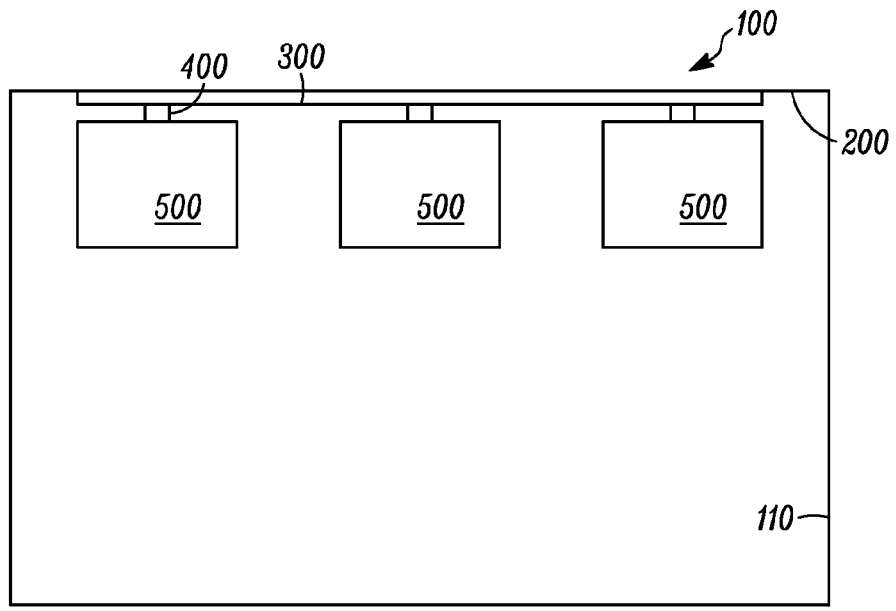
FIG. 1 is a front view of a storage system, according to an example embodiment.
Figure 2:
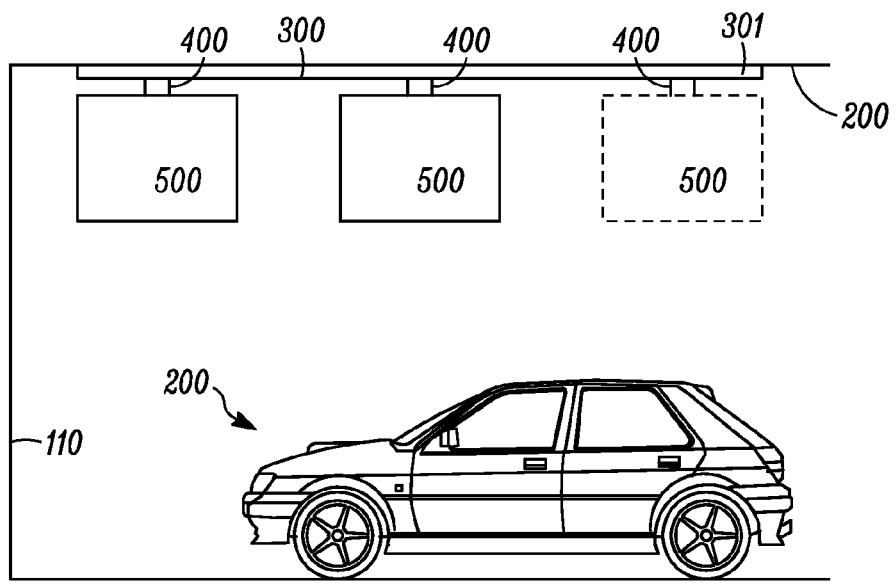
FIG. 2 is side view of the storage system shown in FIG. 1, according to an example embodiment.

FIG. 1 is a front of a storage system 100, according to an example embodiment. FIG. 2 is a side view of the storage system 100, according to the example embodiment. It should be noted that the storage system 100 can be used in any number of situations, however FIG. 1 and FIG. 2 shows the storage system 100 installed in a residential garage. Therefore FIG. 1 is a view with a garage door open from a driveway or similar end view. The storage system 100 includes a rail system 300 and at least one storage container 500 which is attached to the rail system 300. Of course, the rail system is not required for use of the storage system. The storage container 500 is attached to the rail system 300 by way of a hoist system 400. As shown in FIG. 1, three containers 500 can be seen from this end view. Now turning to the side view shown in FIG. 2, it can be seen that the containers 500 can be stacked along the rail system 300. In other words, as shown in FIGS. 1 and 2, there are six storage containers 500 stored on the rail system 300. The rail system 300 can be attached in any orientation. As shown in FIG. 1 to the rail system 300 is attached to the ceiling 120 of a garage 110. FIG. 2 also shows a container 500 in phantom. This depicts that the storage containers 500 are capable of moving from one storage position to a position over a vehicle 200. The vehicle 200 can be positioned directly below an endpoint 301 of the rail system 300. The hoist 400 associated with the storage container 500 can then be used to lower the storage container 500 on to the vehicle 200. The storage container 500 attached the vehicle and the user can drive away with the storage container 500 atop the vehicle 200. The storage container 500, therefore, does not have to be emptied of its contents and repacked into a separate rooftop carrier. This saves the user time in that certain sets of supplies do not need to be found and repacked into a rooftop carrier. It is contemplated that the storage containers 500 can be labeled with a listing of contents. Depending upon what is needed, the user can move the storage containers 500 the various positions and get a desired storage container to the endpoint 301 of the railing system 300. The desired storage container 500 can then be lowered to the car or other vehicle 200 and attached thereto.

Figure 3:
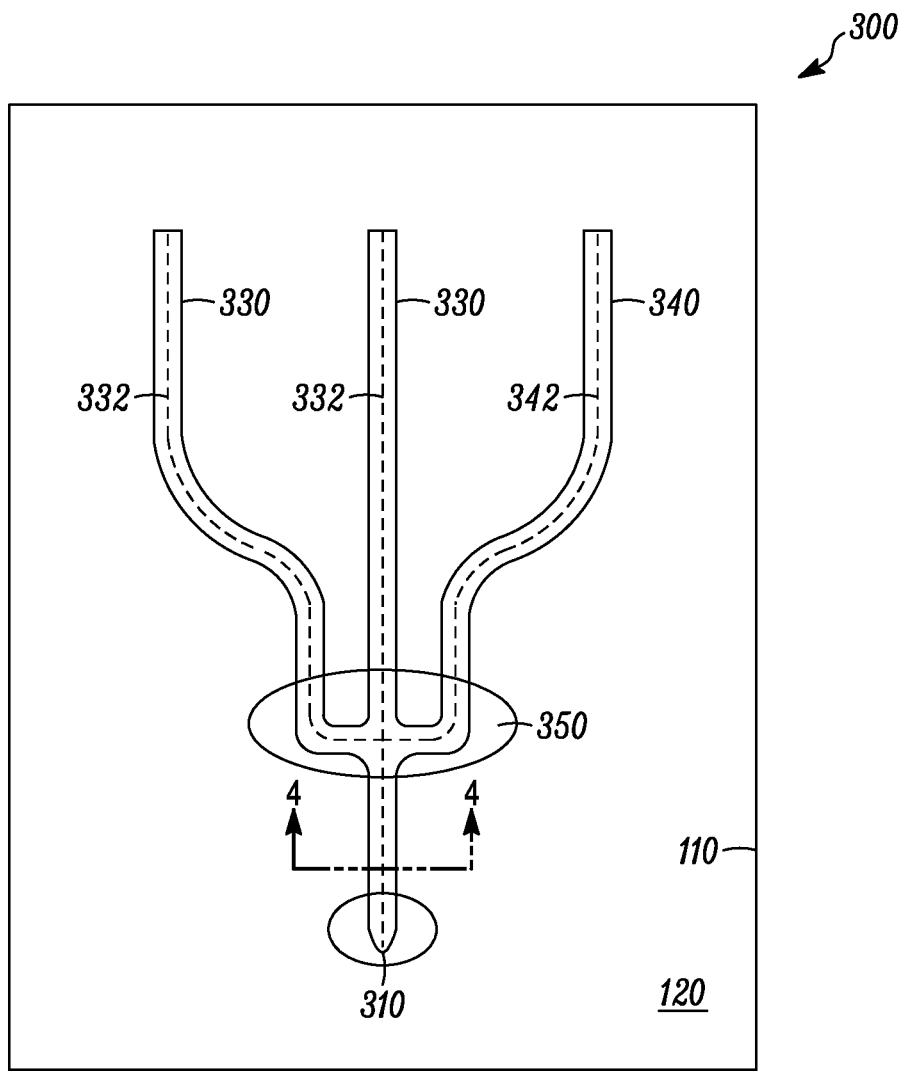
FIG. 3 is a view showing the ceiling having a rail system of a storage system attached thereto, according to an example embodiment.

FIG. 3 is a view showing the ceiling 120 having a rail system 300 of a storage system 100 attached thereto, according to an example embodiment. The rail system 300 includes a main branch 320, a first subbranch 330 and the second subbranch 340. In this view, the storage containers 500 have been removed for the sake of clarity. The construction of the rail system 300 is substantially the same across the main branch 320, the first subbranch 330, and the second subbranch 340. Each of the main branch 320, the first subbranch 330, and the second subbranch 340 are comprised of a beam having a slot or groove therein. On the main branch 320 there is a slot 322. Similarly on these first subbranch 330 there is a slot 332 and on the second sub branch 340 there is a slot 342. The storage containers 500 have an attachment mechanism 502 that fits within or around the slot. In some instances the attachment mechanism 502 is a wheel and in other instances the attachment mechanism 502 is a roller. The attachment mechanism allows the container to move along the length of the main branch 320, the first subbranch 330 and the second subbranch 340.

The rail system 300 also includes a transfer station 350. The transfer station is the confluence of the main branch 320, the first subbranch 330, and the second sub subbranch 340. Storage container 500 and its respective attachment mechanism 502 can be moved to the transfer station 350 where it can be transferred to another one of the other branches or transported down to the endpoint 310 of the main branch 320. It should be understood that when a plurality of storage containers are stored on the rail system the containers 500 can be moved on to the various branches to get at a desired container 500. For example, if a container 500 is positioned close to the back wall of the garage 110, the containers in front of it can be moved and placed on different branches so that the containers can be rearranged or so that the particular container 500 can be placed at a desired location. For example the container that was previously at the back wall of the garage 110 may include camping equipment and therefore need to be moved through the transfer station 350 up to the endpoint 310 or near the endpoint 310 where is positioned over a vehicle, such as vehicle 200. The camping equipment storage container 500 lowered onto the vehicle 200 and attached so that the families camping gear is now a rooftop carrier or in the bed of a pickup truck or the like. It should be noted that the container 500 can be provided with a hoist system, in one embodiment. In another embodiment there may be locations on the rail system that have hoist the can be used to release the container and lower the container from that location.

Figure 4:
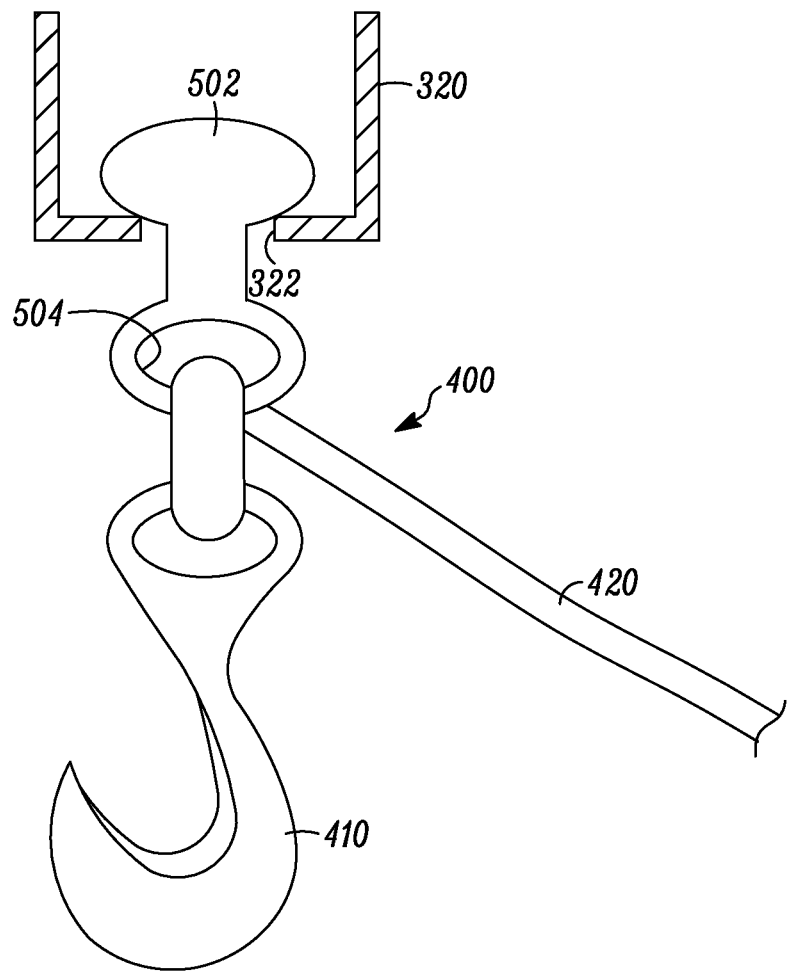
FIG. 4 is a hoist system of a storage system, according to an example embodiment.

FIG. 4 is a hoist system 400 of a storage system, according to an example embodiment. This is a simple example of a hoist system 400 for a storage system 100. The hoist system includes a hook 410 for attaching to a container 500. The hoist system also includes a rope or other line 420 which can be used to raise or lower the hook 410 with respect to the attachment mechanism 502 of the container 500. As shown the attachment mechanism is an enlarged head or mushroom end that slides within the slot 322 of the main beam 320. The attachment mechanism 502 could be made of metal or of a durable nylon such as a PTFE Teflon bushing which is available from polygon company of Walkerton, Ind. USA. The PTFE Teflon has an advantage in that it provides its own permanent lubrication and is therefore graceless. Therefore there is little chance of having grease or other contaminants foul the storage containers 500. The attachment mechanism 502 also includes an eyelet 504 which accommodates the line 420 of the hoist mechanism 410. It should be noted that more complex hoist mechanisms 410 can also be substituted for the symbol hoist mechanism shown in FIG. 4. For example, a hoist mechanism may be used from Harken, Inc. of Pewaukee, Wis., USA. Harken, Inc. uses hardware, used for lines in yachts or sailboats. The hardware is capable of holding loads and maintaining its holding power for extended lengths of time.

Figure 5A:
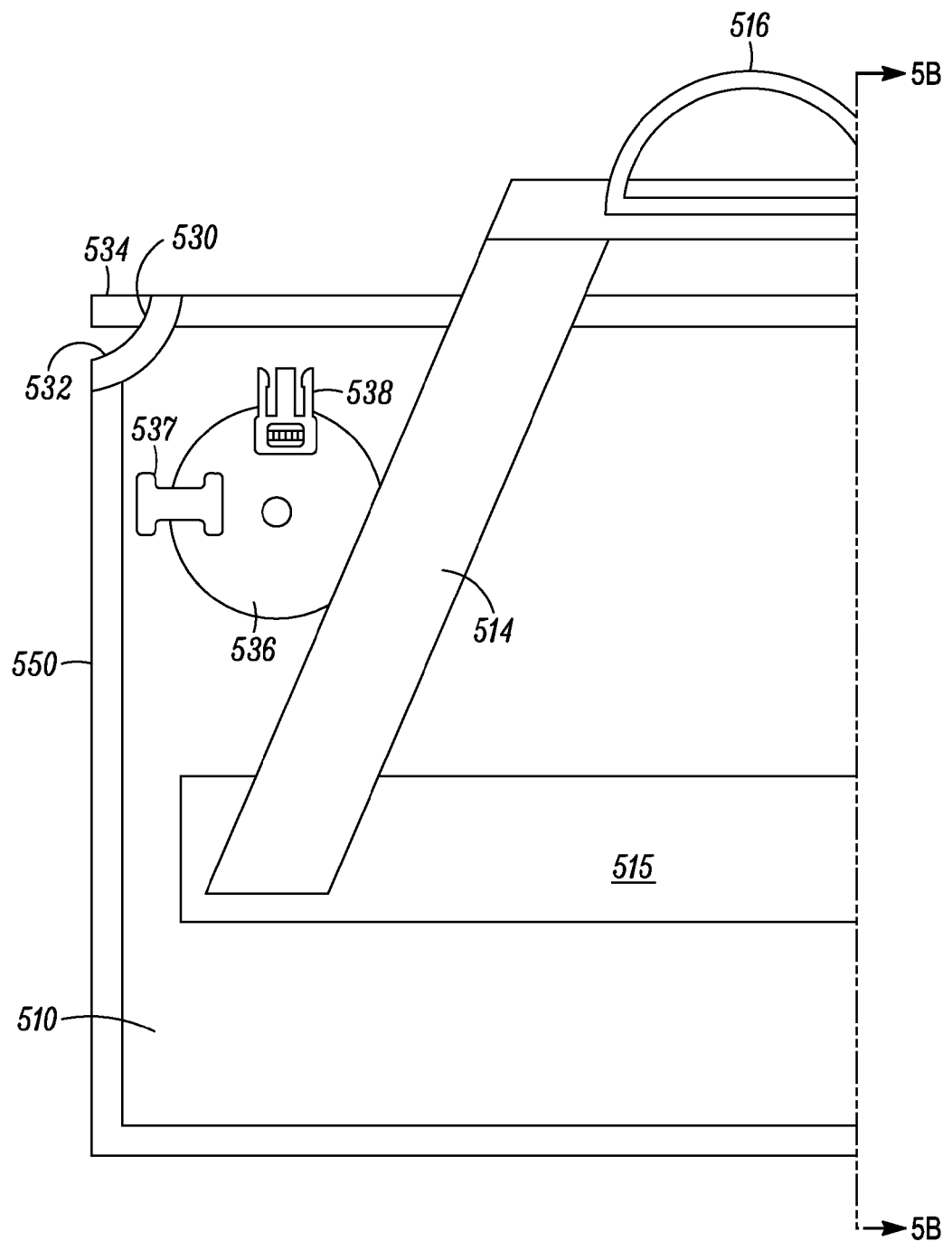
FIG. 5A is a portion of a front view of a storage container, according to an example embodiment.
Figure 5B:
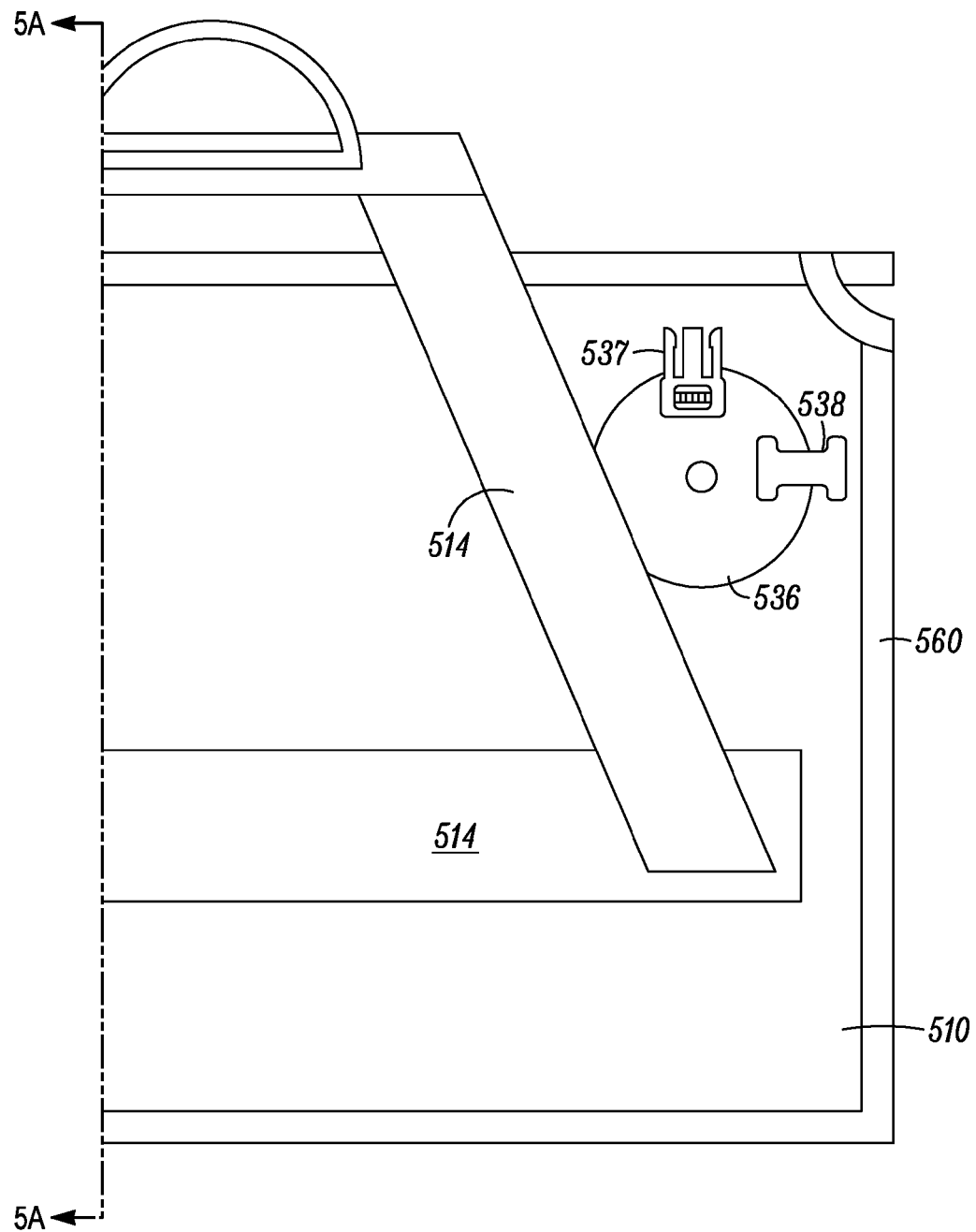
FIG. 5B is a portion of a front view of a storage container, according to an example embodiment.
Figure 6A:
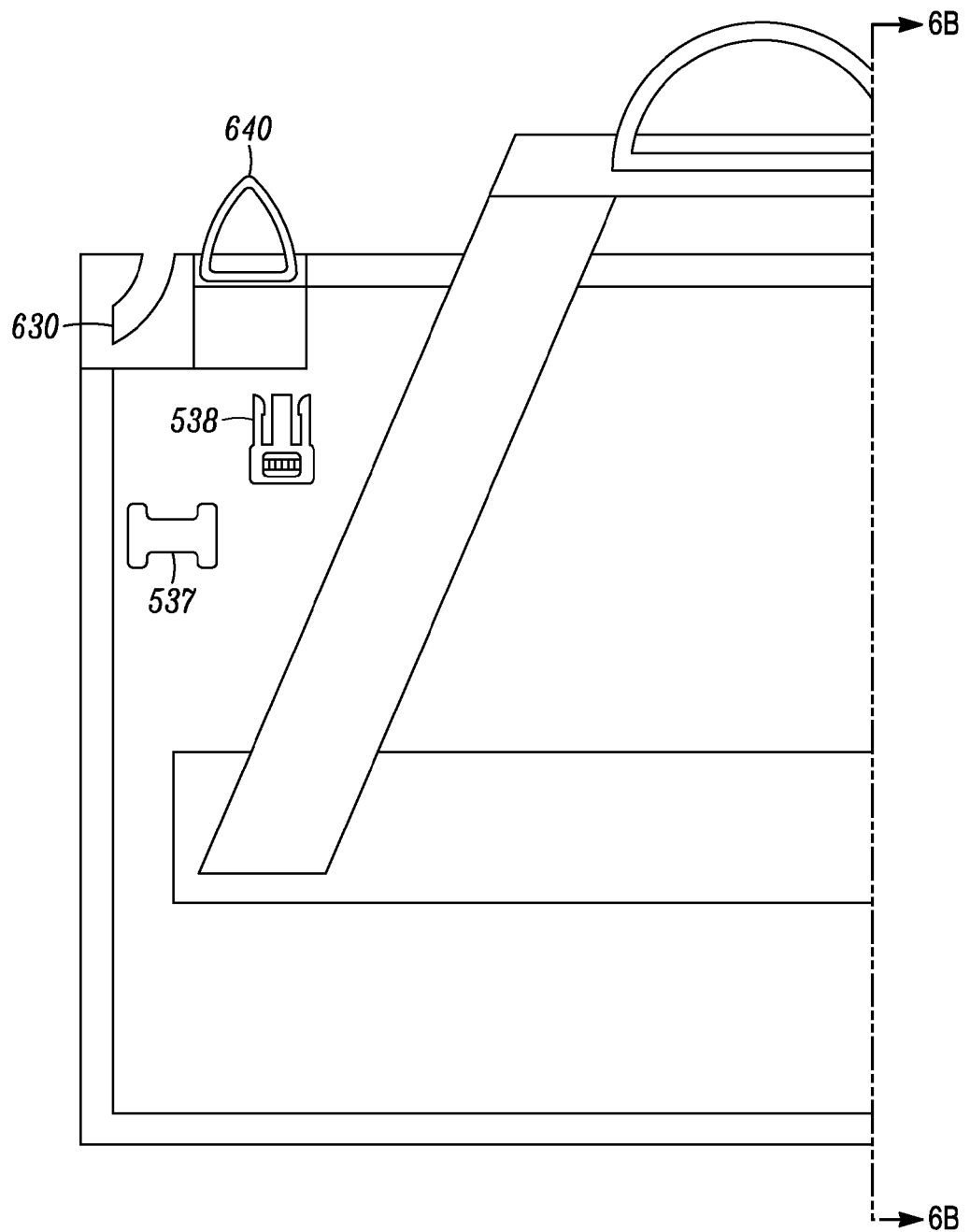
FIG. 6A is a portion of a side view of a storage container, according to an example embodiment.
Figure 6B:
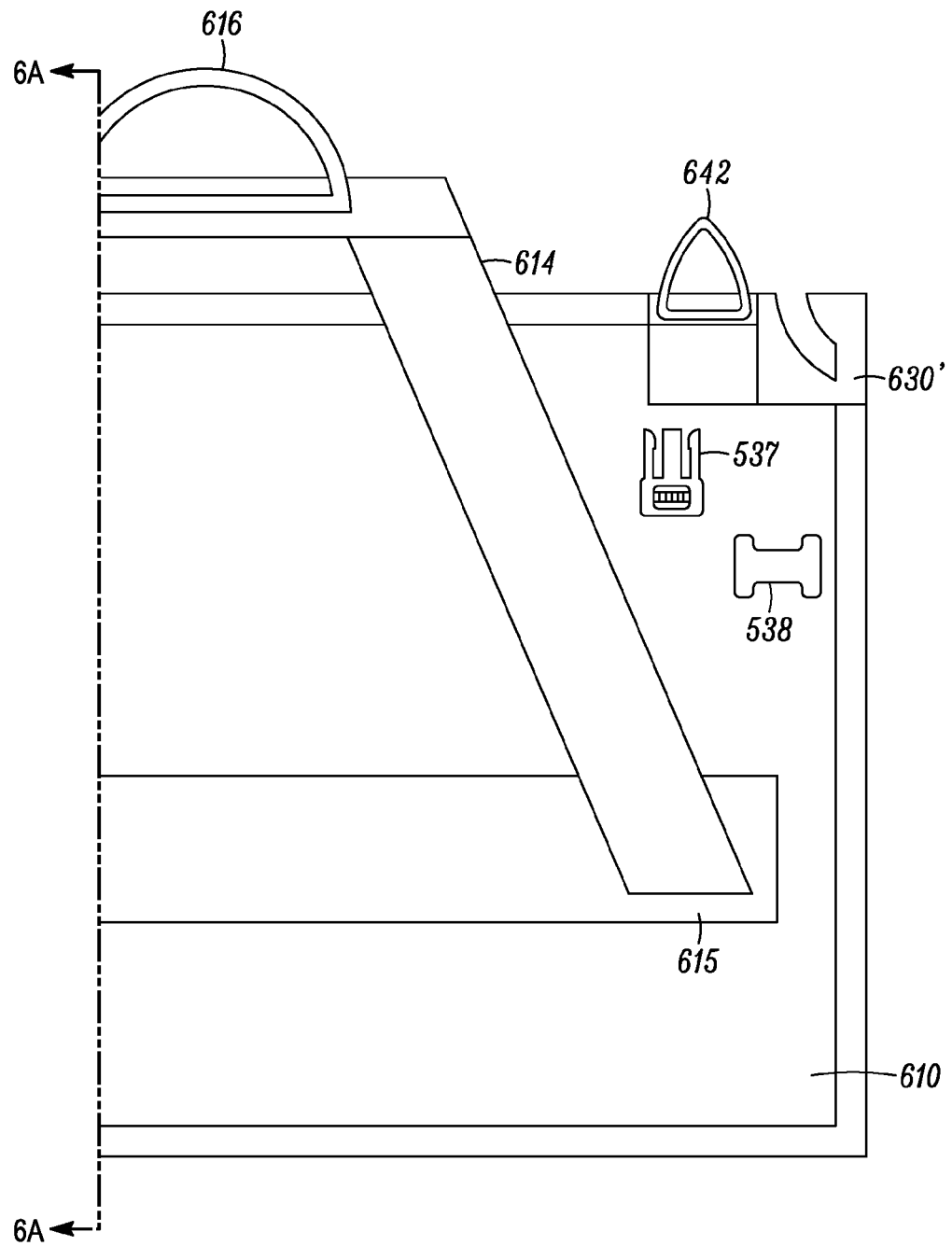
FIG. 6B is a portion of a side view of a storage container, according to an example embodiment.

FIG. 5A is a portion of a front view of a storage container 500, according to an example embodiment. FIG. 5B is a portion of a front view of a storage container 500, according to an example embodiment. FIG. 6A is a portion of a side view of a storage container 500, according to an example embodiment. FIG. 6B is a portion of a side view of a storage container 500, according to an example embodiment. Now looking at each of the FIGS. 5A, 5B, 6A, and 6B the storage container 500 will be further detailed. The storage container 500 shown in FIGS. 5A, 5B, 6A, and 6B is a soft sided storage container. In other words, the walls or side panels of the storage container are made of a fabric such as ballistic nylon or other tough and strong fabric. FIGS. 5A and 5B are two halves that make a whole drawing of the front of the storage unit 500. Each storage container 500 includes a front panel 510, a back panel 512, a first side panel 520 and a second side panel 522. The front panel 510 and the back panel 512 are substantially the same. Therefore rather than discussing both the front panel 510 and the back panel 512 only one will be discussed for the sake of brevity. The front panel 510 includes a strap 514 that is substantially trapezoidally-shaped. The strap 514 is sewn or otherwise attached to the sidewall 510 using a reinforcement strap 515. The elongated base of the strap 514 is attached to the front panel 510. The other end of the strap 514 includes a ring 516. The ring 516 is made of a very strong and durable material and is used to hang to the hook 410 of the hoist system 400. The top edge of the front panel 510 includes a seam which forms a sleeve 530. The corners of the front panel 510 includes a cutout 532. A pole 534 fits within the sleeve 530. The pole 534 is dimensioned so it is substantially the same with as the front panel 510. The front panel also includes a reinforcement patch 536 and 536'. Attached to each of the reinforcement patches 536, 536' are a pair of parachute clips. As shown, a male portion 537 of the parachute clip is attached to each of the patches 536, 536' and the female portion 538 of the parachute clip is also attached to each of the patches 536, 536'. These ends of the parachute clip type connectors are used to attach straps around the container as needed. The sides of the front panel 510 also include a sleeve 550, and a sleeve 560. The sleeves 550, 560 are sized, in some embodiments, to receive a pole (not shown) within the respective sleeve 550, 560. The poles provide rigidity to the front panel 510 as well as the back panel. It should be noted that the front panel 510 is substantially the same as the back panel 512.

Now turning to FIGS. 6A and 6B, the side panels 610, 612 will now be discussed. The side panel 610, 612 are substantially the same and therefore only the side panel 610 will be discussed in detail with the understanding that the other side panel is similarly constructed. The side panel includes a trapezoidally shaped strap 614. The trapezoidally shaped strap 614 is connected to the side panel 610 by a reinforcing strap 615. The top of the strap 614 carries a ring 616 made of durable material, such as steel, stainless steel, high-strength plastic or the like. The ring is used for hanging the storage container 500 on to the hook for 10 of the hoist system 400. The edges of the side panel 610 includes sleeves used to house pipes or poles that provides rigidity for the side panel 610. Also, near the upper corners of the side panel 610 are male clip ends 537 and female clip ends 538 of parachute clips. Near the upper corners of the side panel 610 and sewn into the side panel or otherwise attached to the side panel are latching locations 630 and 630'. The latching locations 630, 630' each have a slot for receiving a pole, such as pole 534 from the front panel 510 or the back panel 512. Attached inboard the corner is a first ring 640 and the second ring 642. The first ring 640 and second ring 642 are used to hook the storage container 500 to a spot on the garage ceiling 120 (shown in FIGS. 1-3). This particular embodiment the storage container 500 is moved using the rail system 300 to a position on the ceiling that includes hooks or another hoisting mechanism. The rings 640, 642 can then be used to attach to the permanent hooks in the ceiling 120.

Figure 7A:
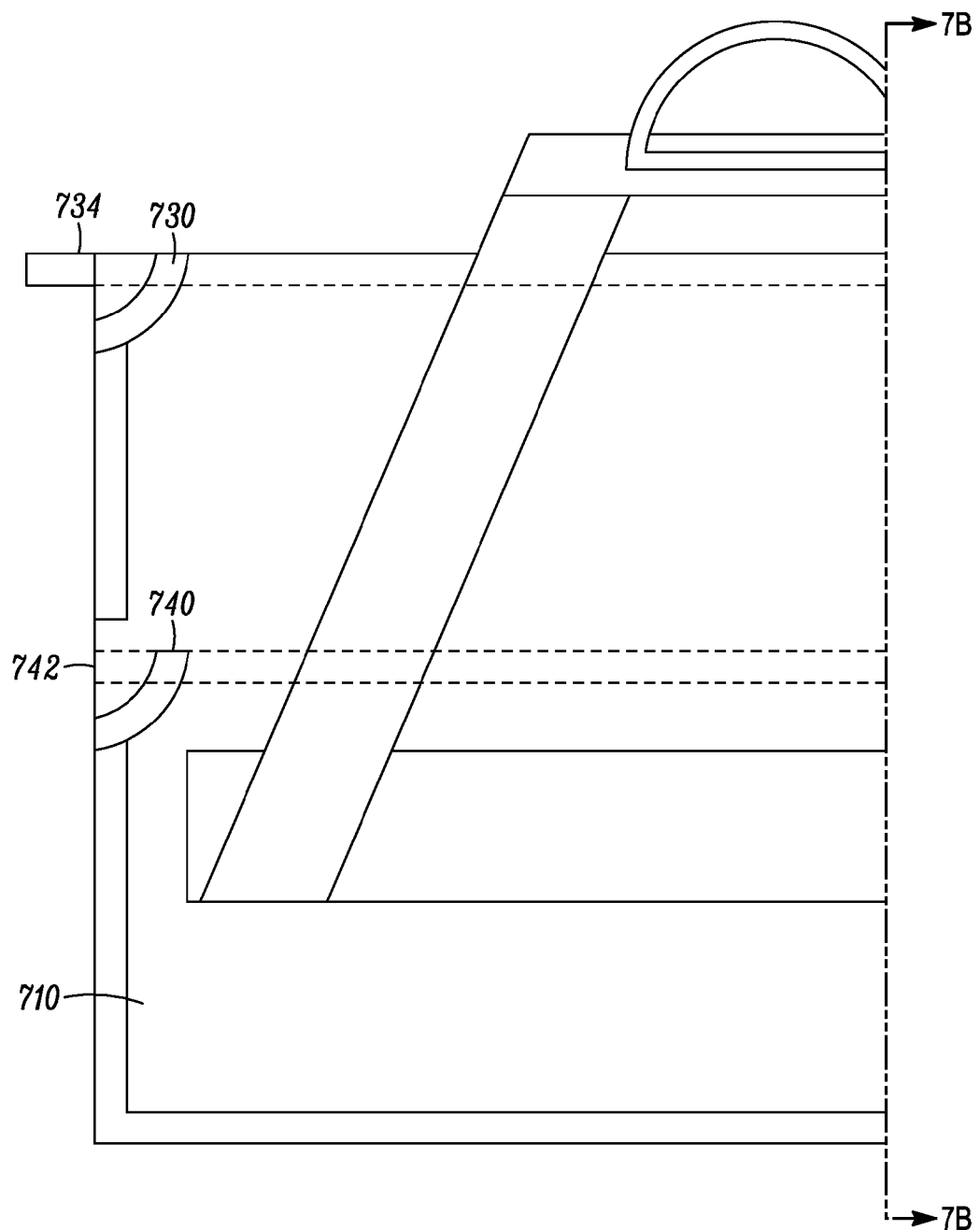
FIG. 7A is a portion of a front view of a storage container, according to another example embodiment.
Figure 7B:
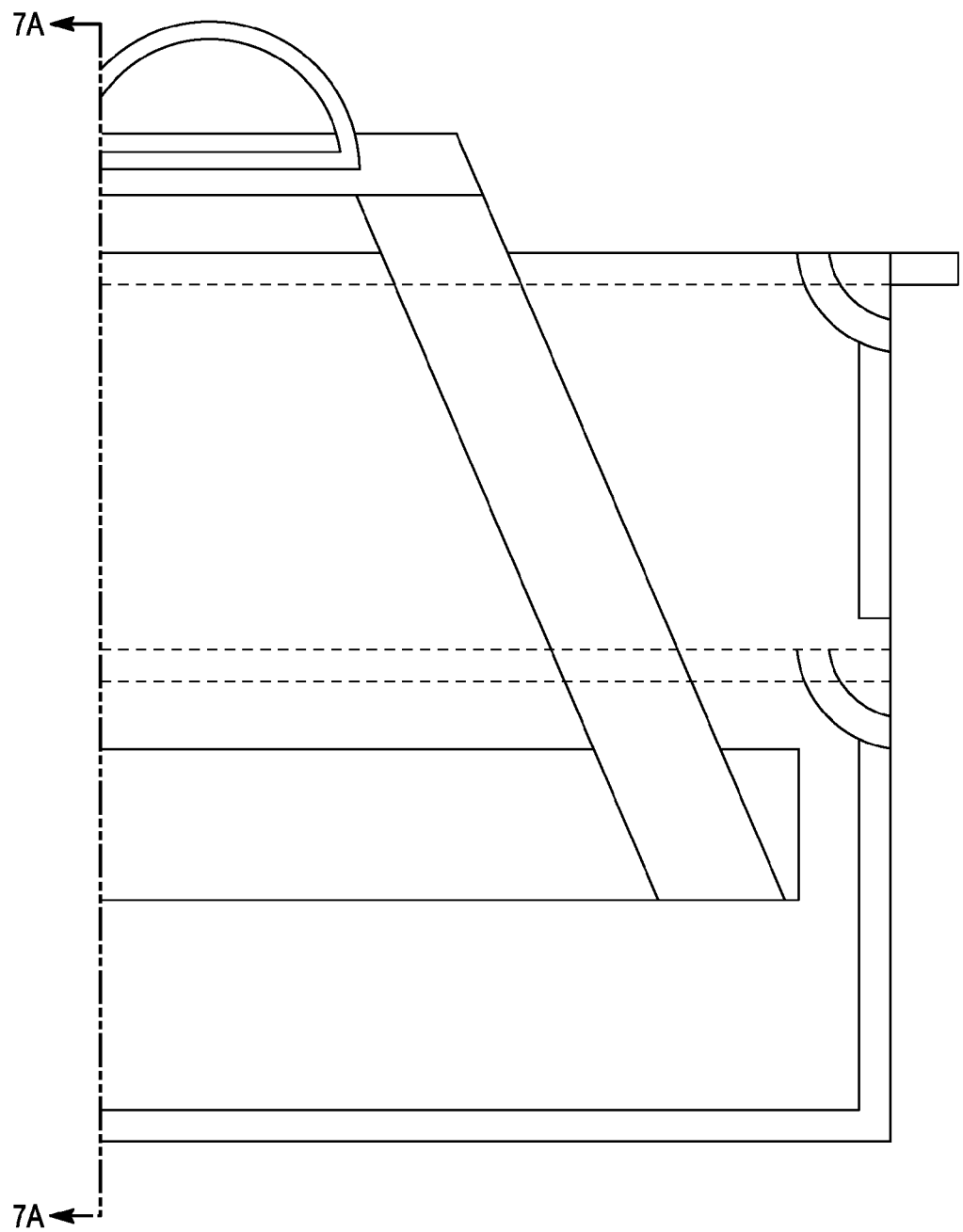
FIG. 7B is a portion of a front view of a storage container, according to another example embodiment.
Figure 8A:
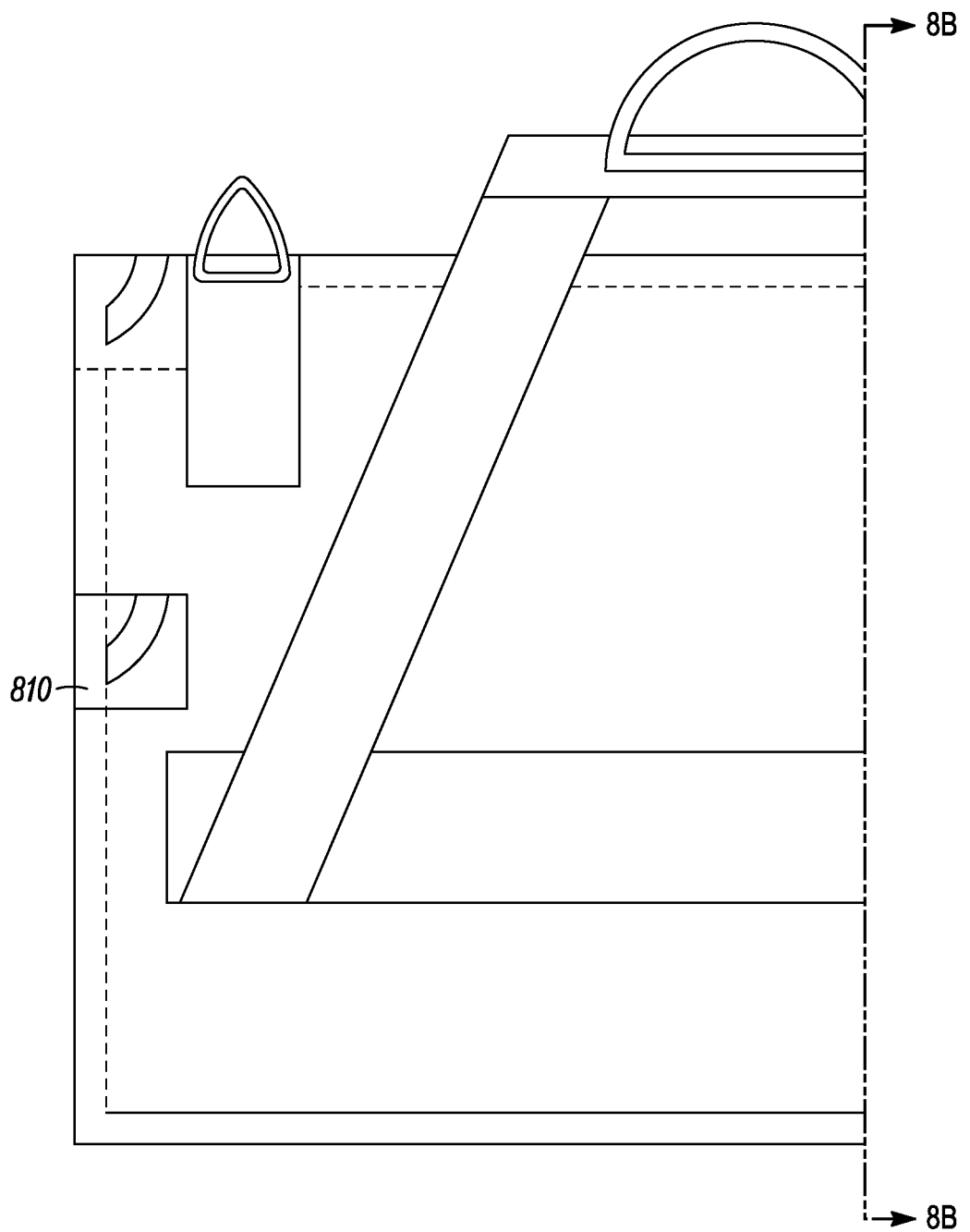
FIG. 8A is a portion of a side view of a storage container, according to another example embodiment.
Figure 8B:
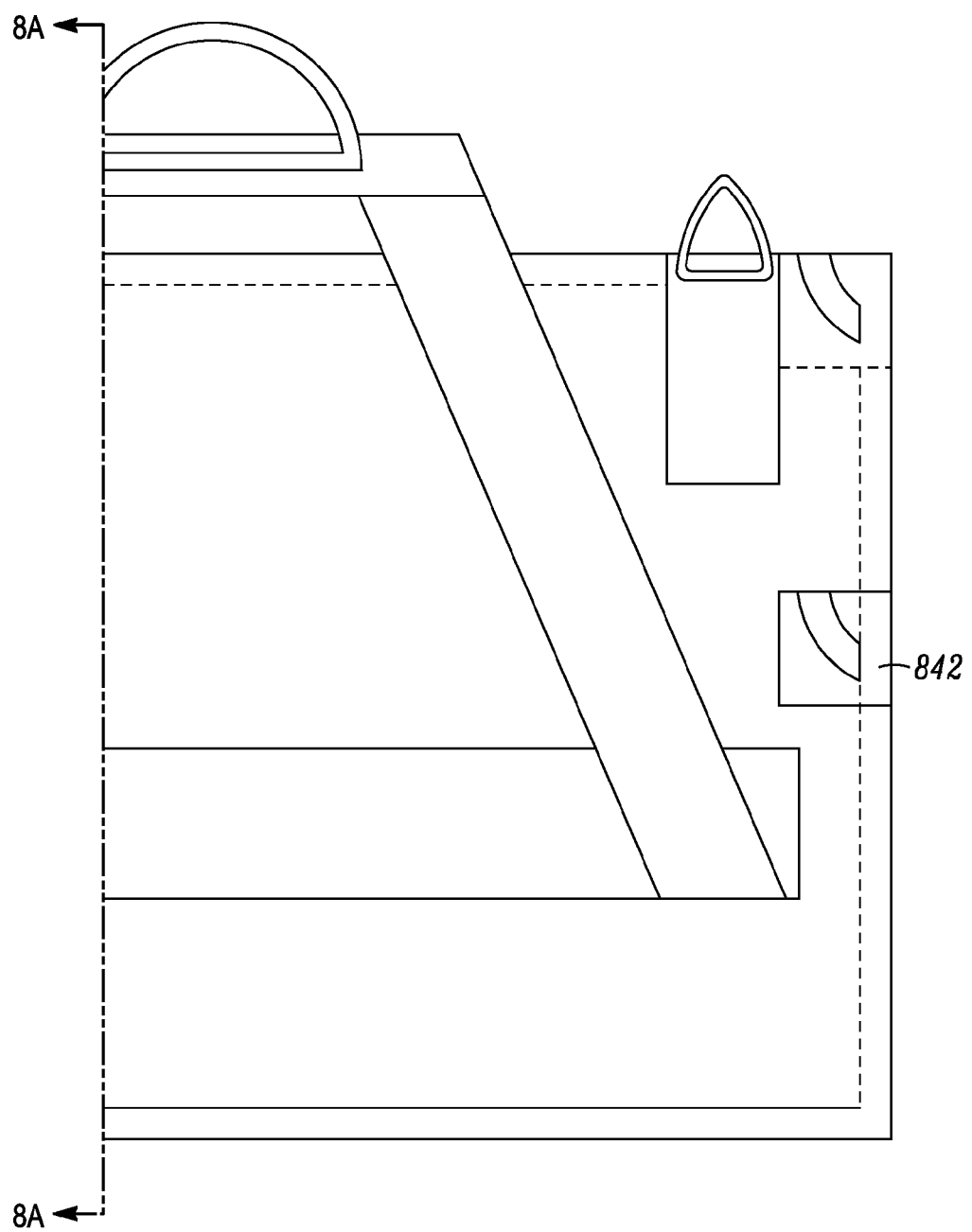
FIG. 8B is a portion of a side view of a storage container, according to another example embodiment.

FIG. 7A is a portion of a front view of a storage container, according to another example embodiment. FIG. 7B is a portion of a front view of a storage container, according to another example embodiment. FIG. 8A is a portion of a side view of a storage container, according to another example embodiment. FIG. 8B is a portion of a side view of a storage container, according to another example embodiment. Now referring to FIGS. 7A, 7B, 8A and 8B, another embodiment of a storage container 700 will be discussed. Referring first to FIGS. 7A and 7B the front panel 710 will be discussed. The front panel has many of the same features as the front panel 510. Therefore for the sake of brevity, the differences between the front panel 710 and the front panel 510 will be set forth in this discussion. Seams along the top edge of the front panel 710 form a sleeve 730. The sleeve 730 carries a pole 734. Parallel to the top edge of the front panel 710, another sleeve 740 is formed from a seam sewn within the front panel 710. The sleeve 740 carries a second pole 742. The sides of the front panel 710 are also provided with sleeves the carry poles to reinforce the sides of the front panel 710 and also provide rigidity to the front panel 710. The sides of the front panel carry a pair of poles. In this manner, a top portion of the front panel 710 can be folded down while the bottom portion of the front panel 710 remains in place since the pole 742 is latched at another latching point (shown in FIGS. 8A and 8B).

It should be noted that the side panels or end panels of the storage container may be folded back to allow for connection of two or more storage containers. In this way a customizable storage container can be formed having various sizes as needed. For example, if a long storage containers needed to hold long boards for example the side panel of the first storage container can be dropped and the side panel of the second storage container can also be dropped. This allows the front panel and the back panel of the first storage container to be directly attached to the front panel and back panel of the second storage container. This would form an elongated container that could hold long member's. Similarly, two containers could be connected front to back to form a more square shaped container. In still a further embodiment the sidewalls of one of the containers can be dropped halfway so that the resulting container includes a natural divider at the bottom or near the floor. Of course, the end walls of two containers can be attached are configured in a similar way.

In still a further embodiment, the containers can be stacked. For example one container could be stacked atop another container. The rings 640, 642 of a first container could attached to the bottom of a second container, in one example embodiment. Course the rings 640, 642 would have to be placed along at least three attachment points on the upper of the stacked containers. In one embodiment, the ring 640, 642 would be located at the corners of the lower storage unit and corresponding hooks or other couplers will be located at the corners of the upper storage unit or container.

FIGS. 8A and 8B depict the first side panel 810 and the second side panel 812 of the storage container 700. Again the construction of each of the side panels 810, 812 is substantially the same. As a result only one side panel 810 will be discussed herein. Furthermore the side panel 810 is very close in construction to the side panel 610. For the sake of brevity only the differences between the side panel 810 and the side panel 610 will be discussed. The side panel 810 is provided with an extra set of latching locations 840, 842. The latching locations receive or latch the end of the pipe 742 at the latching location 842. Similarly a pipe also laches to the latching location 840. This is in addition to the latching locations found in the upper corners of the side panel 810. This is the main difference between the panel 610 and side panel 810.

Figure 9:
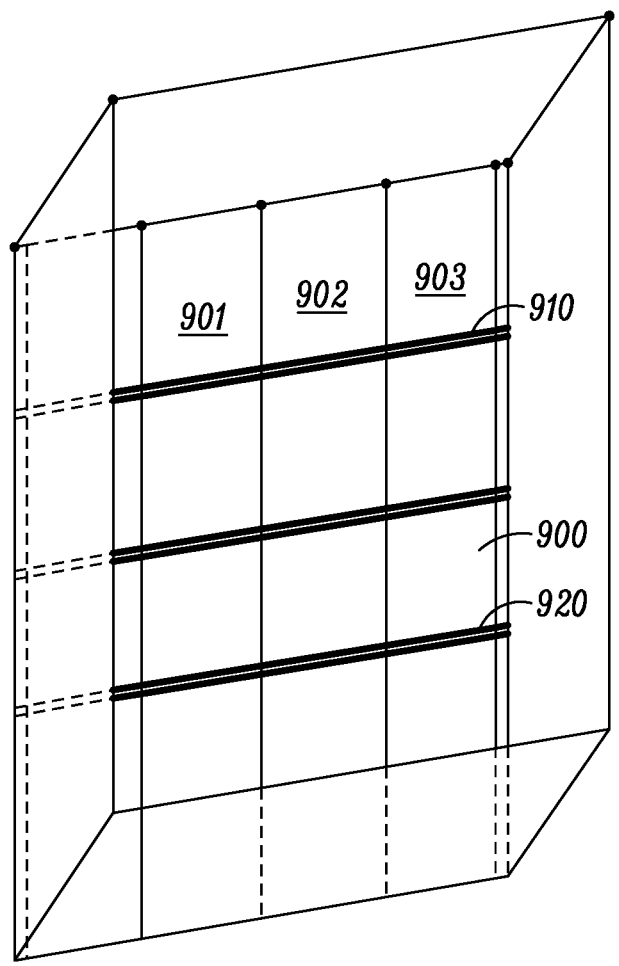
FIG. 9 is a top view of a storage container, according to an example embodiment.

FIG. 9 is a top view of a storage container 500, 700, according to an example embodiment. FIG. 9 shows possible dimensions of the containers 500, 700 as well as the construction of the floor 900 of each of the containers 500, 700. Below the floor 900 is a first reinforcing member 910 and the second reinforcing member 920. The floor 900 is formed from a plurality of tongue and groove components 901, 902, 903. Each of the tongue and groove components 901, 902, 903 have one edge with a channel therein and another edge with a tongue thereon. The tongue fits within the channel of the various tongue and groove components 901, 902, 903. Thus, the floor can be quickly formed from several of the tongue and groove components 901, 902, 903. The floor 900 is held in place or prevented from breaking up by the reinforce lutes 910 and 920. Of course, in some embodiments there may be more reinforcing members than the two shown. Generally, more reinforcing members are needed to carry or accommodate heavier loads.

Figure 10:
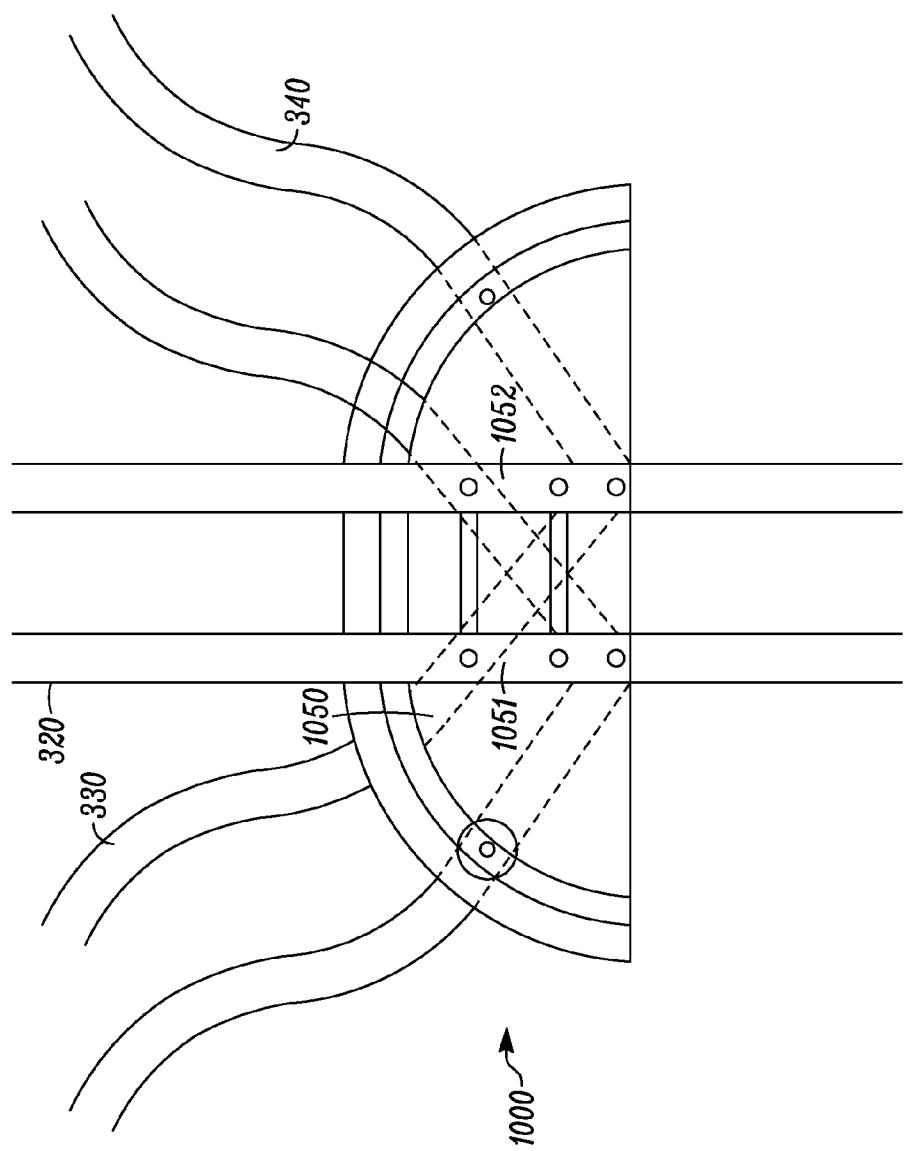
FIG. 10 is a bottom view of a rail system, according to an example embodiment.

FIG. 10 is a bottom view of another embodiment of a rail system 1000. The rail system 1000 is somewhat similar to the rail system 300 which is discussed above. Rather than describe the entire rail system 1000, the differences between the rail system 300 and the rail system 1000 will be discussed below for the sake of brevity. The rail system 1000 includes a main branch 320, a first subbranch 330 a second subbranch 340. The various branches 320, 330, 340 can be placed in various configurations. It should also be noted that the branches 320, 330, 340 can be of various shapes to accommodate different situations. In addition, it should be noted that there is no limitation to just three branches. In some applications there may be more branches and in still other applications there may be less branches then shown in FIGS. 3 and 10. The rail system 1000 includes a transfer or switching area 1050. In this particular rail system 1000, the transfer or switching area 1050 includes a set of rails 1051, 1052 that are capable of rotating to various positions to mate or a line with the various branches 320, 330, 340. This particular embodiment of the rail system 1000 is more like a rail road roundhouse where a locomotive (storage system) is placed on the rails 1051, 1052 and is rotated into alignment with another branch 320, 330, 340 and then moved on to the other branch 320, 330, 340. In FIG. 10, the transfer station 1050 and more specifically the rails 1051, 1052 are capable of rotating in an arc of less than 180°. Should be noted that in other embodiments, the transfer station 1050 can be circular so that the rails 1051, 1052 can be rotated around the circle or around 360°. Of course the rails 1051, 1052 can be rotated in unison and therefore the rails 1051, 1050 to remain in parallel so that they can still hold a connector, such as connector 1060. The connector 1060 includes an upset end 1061, a main body 1062, and a loadbearing and 1063. In some respects the connector 1060 appears to be shaped like a spool. The upset and 1061 engages the rails, such as rail 1051 and rail 1052. The rails 1051, 1052 are curved portions which are attached to a surface 1070. The mobile connector 1060 can be made of a self lubricating nylon, such as duralon or a similar material. As mentioned previously, the self-lubricating nylon is advantageous in that there are really no lubricants to drip off the connector 1060 and contaminate the contents within a storage container attached to the connector 1060.

Of course it should be pointed out that the storage systems described above can be used without a rail system, such as rail system 300 or rail system 1000. A set of hooks or ceiling hooks can be attached to the ceiling of a garage or other storage area that correspond to the rings or hooks 640 and 642 that are positioned at or near the corners of the storage containers.

It should also be pointed out that each of the rail systems 300, 1000 can be constructed of numerous pieces of track so they can be configured in a customizable fashion. By placing the rail systems 300, 1000 in smaller pieces, the packaging of the rail systems and the storage system in general will be smaller. This will enable the storage systems to more easily gain shelf space in various retail outlets, such as big-box stores or smaller lumber yards. In one embodiment the track pieces could be as small as 16 inches in length. In other embodiments, the length of the rail portions could be shorter or even longer. Having shorter pieces allows for increased flexibility when assembling a specific system. Also having shorter pieces allows for maximum configurability and customizability.

Figure 11:
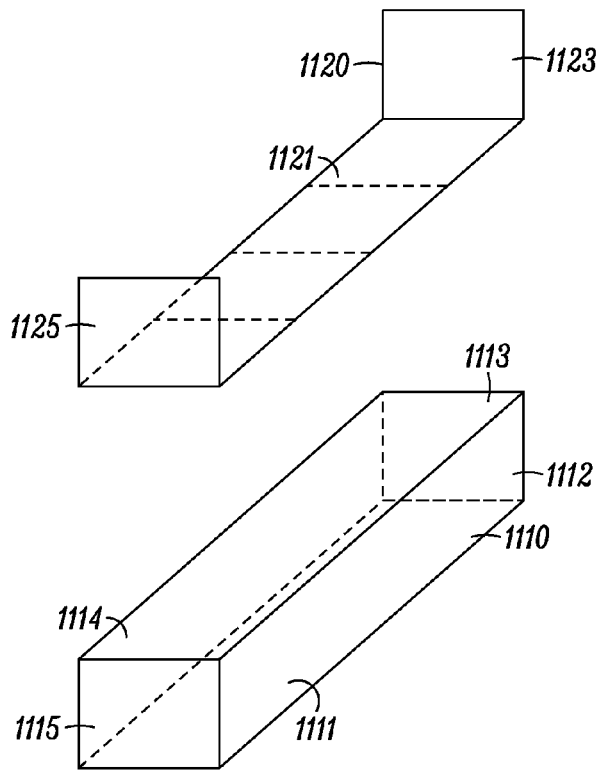
FIG. 11 is a perspective view of a storage container that includes an insert, according to an example embodiment.
Figure 12:
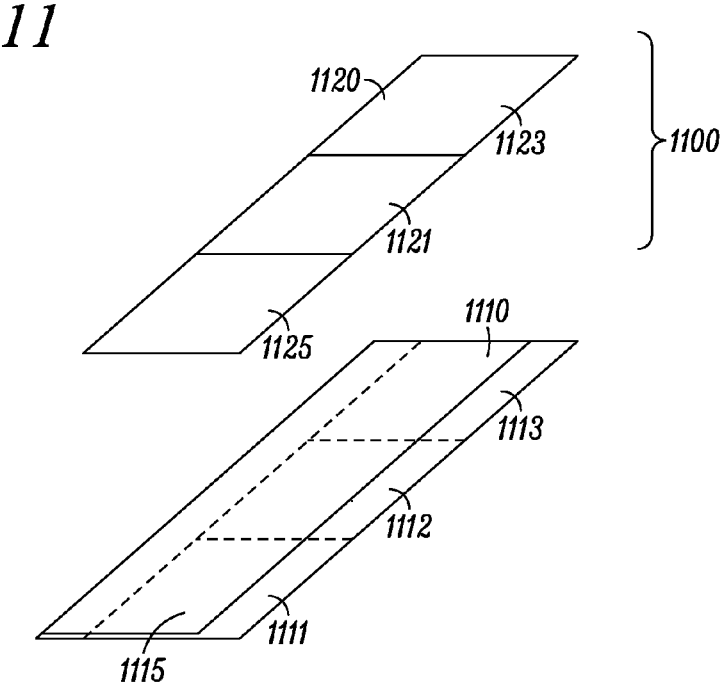
FIG. 12 is a perspective view of the storage container of FIG. 11 shown with the components in a folded position, according to an example embodiment.

FIG. 11 is a perspective view of a storage container 1100 that includes a main portion 1110 and an insert 1120, according to an example embodiment. FIG. 12 is a perspective view of the storage container of FIG. 11 shown with the components 1110, 1120 in a folded position, according to an example embodiment. Now referring to both FIGS. 11 and 12, the storage container 1100 will be further detailed. The main portion 1110 includes a floor 1111 and a set of sidewalls 1112, 1113, 1114, and 1115. The floor 1111 in the main portion 1110 can be formed of a number of planks, similar to the ones shown in previous embodiments. This provides for a stiff or substantially stiff floor 1111. At least two of the sidewalls, such as 1112 and 1114 are also provided with a stiffener or stiffening material. The other two sidewalls, such as sidewalls 1113 and 1115, are merely cloth or are soft sided. The main unit can therefore be folded quite easily given that the sidewalls 1113 and 1115 are soft sided.

The insert 1120 includes a floor 1121 and a set of sidewalls 1123 and 1125. In one embodiment the floor 1121 is also stiff. In one such embodiment, the floor 1121 includes a plurality of planks such as those discussed and shown above in previous embodiments. The sidewalls 1123 and 1125 are also stiff or provided with stiffening materials. The sidewalls 1125 and 1123 are also sized so that they fit within the area of the corresponding sidewalls 1113 and 1115 of the main body portion 1110. The insert 1120 is sized so that it can be deployed and inserted into the main portion 1110. The floor 1121 corresponds to the floor 1111 of the main portion and the sidewalls 1125 and 1123 correspond to the sidewalls of the main portion 1115 and 1113. By inserting insert 1120 and unfolding the flaps 1123 1125 to a position where the flaps 1123 1125 abut or are closely spaced from the corresponding sidewalls 1113 and 1115, a substantially hard wall container 1100 is formed. In other words, the stiff sidewalls 1123 and 1125 of the insert 1120 interact with the stiff sidewalls 1112 and 1114 of the main body portion 1110 to form a frame and stiff walled container. The floor 1121 of the insert 1120 serves as a spacer between the flaps 1123 and 1125. The floor 1121 can also be used to further stiffen the floor 1111 of the main body 1110. Thus the insert 1120, when placed into the main portion 1110, provides stiffness to the portions of the main body 1110. In other words, sidewall 1123 stiffens the sidewall 1113, and the sidewall 1125 stiffens the sidewall 1115 of the main body 1110. The floor 1121 of the insert also stiffens the floor 1111 of the main body and spaces the two flaps 1123 and 1125 from one another so that they fit snugly within the main body portion to form a substantially stiff container 1100. In one embodiment stiffening planks are placed in the floor 1121.

In another embodiment stiffening planks are placed in the floor 1111 of the main portion 1110. In still another 1111 and the stiffness of the floor 1121 can be different. The floor 1121 is dimensioned so that is captured between the stiff sidewall 1112 and the stiff sidewall 1114. The floor 1121 also is dimensioned so that the edges of the flaps 1123 and 1125 are positioned between the stiff sidewall 1112 and the stiff sidewall 1114. As a result, when the insert 1120 is placed into the main portion 1110, a substantially stiff container 1100 is formed. The stiff container or container 1100 is capable of being designed to hold various loads. Of course, more stout materials will yield a container capable of carrying heavier loads.

FIG. 11 is shown devoid of straps or a suspension and attachment mechanism for the sake of clarity. It should be understood that the container 1100 can be provided with straps and a suspension system so that the container 1100 can be suspended from a rail system, such as was discussed above. In addition, the container 1100 can include an adapter or other hardware for attaching the container 1100 to an automobile or other movable device. Also noteworthy is that the dimension shown in FIG. 11 are only representative of an example. It is contemplated that the dimensions can be changed for various applications without departing from the spirit of the invention.

FIG. 12 shows that the container 1100 is capable of folding to an undeployed position that would provide for very compact storage of the container 1100. In addition, a container 1100 could be packaged for sale in a very efficient manner. FIG. 12 shows the insert 1120 with the flap 1123 and the flap 1125 folded onto the floor 1121 of the insert 1120. Similarly, the flaps 1112, 1113, 1114, and 1115 are folded onto the floor 1111 of the main portion 1110. When folded, the insert 1120 and the main portion 1110 are both relatively flat. These could be stacked together, packaged and sold as a complete storage container 1100. By the same token, the insert 1120 and the main portion 1110 can also be stored stacked on one another. This further contemplated that one could store a number of main portions 1110 in one stacked and a number of insert portions 1120 in another stack.

Figure 13:
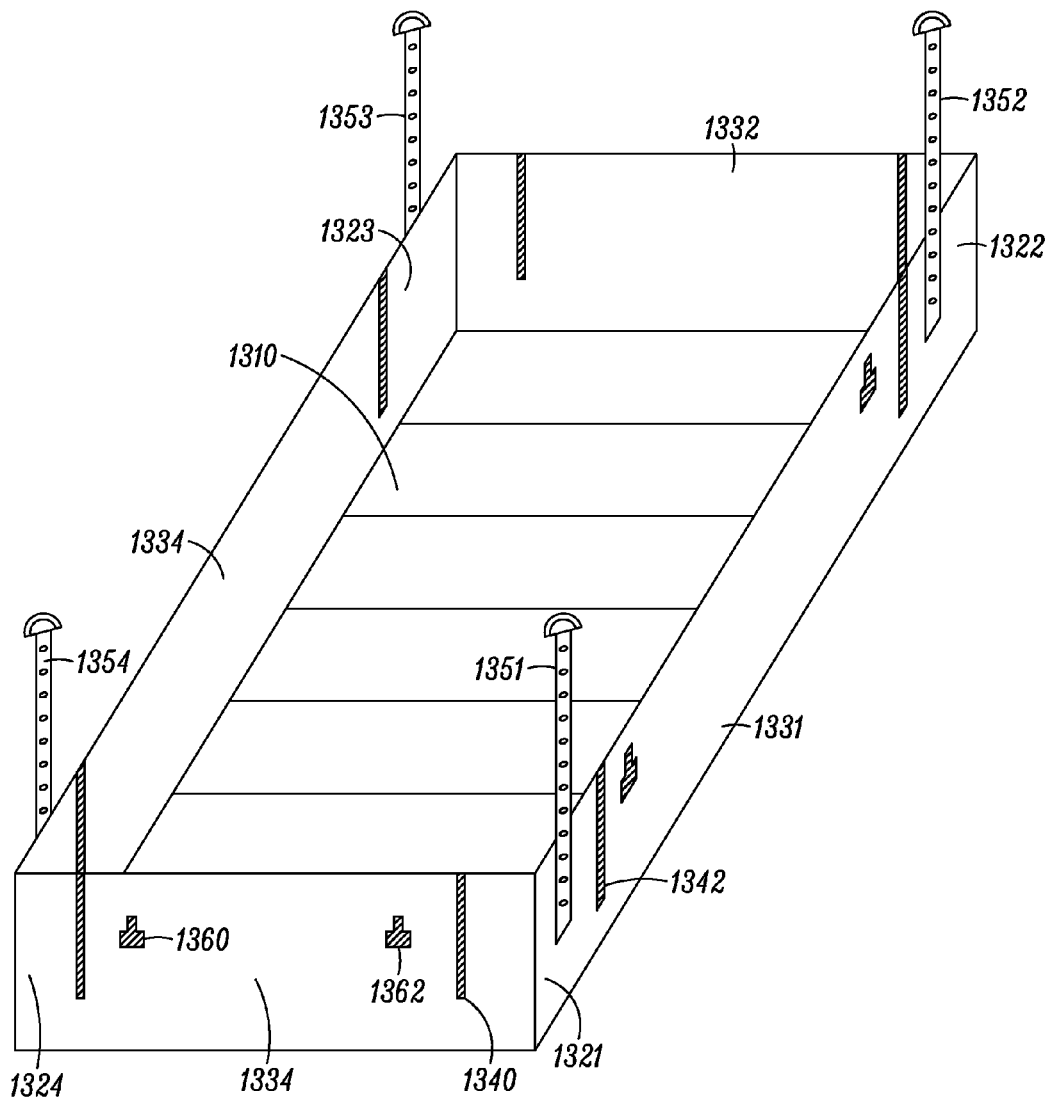
FIG. 13 is a perspective view of another storage container, according to an example embodiment.

FIG. 13 is a perspective view of another storage container 1300, according to an example embodiment. The storage container 1300 includes a floor 1310, a first corner portion 1321, a second corner portion 1322, a third corner portion 1323, and a fourth corner portion 1324. The corner portions are firm or hard. In one embodiment, the corner portions 1321, 1322, 1323, 1324 are made of plastic. The corner portions 1321, 1322, 1323, 1324 are formed of a material which will retain the shape of the corner. The storage container 1300 includes a first sidewall 1331, a second sidewall 1332, a third sidewall 1333 and a fourth sidewall 1334. The sidewalls 1331, 1332, 1333, 1334 are soft-sided. In some embodiments, the sidewalls 1331, 1332, 1333, 1334 can be formed as a pocket capable of carrying a stiffener, such as a board or other stiffener. In another embodiment, the stiffeners are sewn into the sidewalls 1331, 1332, 1333, 1334. The sidewalls 1331, 1332, 1333, 1334 are removably attached to the corners 1321, 1322, 1323, 1324. As shown in FIG. 13, the sidewalls 1331, 1332, 1333, 1334 are attached to the corners 1321, 1322, 1323, 1324 by means of a series of zippers, such as zipper 1340 and zipper 1342. Each corner includes two zippers which zip to a portion attached to a sidewall. The sidewalls 1331, 1332, 1333, 1334 can have varying height dimensions. The zippers can be repositioned or longer zippers can be used when the sidewalls 1331, 1332, 1333, 1334 are high. Attached to the corners 1321, 1322, 1323, 1324 are straps 1351, 1352, 1353, 1354. Each of the straps 1351, 1352, 1353, 1354 includes at least one grommet therein. Also attached to the straps 1351, 1352, 1353, 1354 are D-rings. The D-rings can be used to attach the container 1300 to a lift mechanism. Each sidewall 1331, 1332, 1333, 1334, as shown in FIG. 13 includes one or more plastic latching buckles, such as 1360 and 1362 shown on sidewall 1334. The plastic latching buckles are capable of receiving the D-rings or other connectors that can be used to stack the containers 1300.

In some applications, a first container 1300 can be attached to a second container to form a storage container having a different height. Several containers 1300 can be stacked as desired. The same can be done with other containers discussed above and illustrated in FIGS. 1-12.

A storage system includes a rail system, and a container. The container has an inner compartment. The container further includes an apparatus for supporting the container which also interacts the rail system, and a hoist coupled to the apparatus for supporting the container. The hoist allows the container to be controllably positioned with respect to the apparatus for supporting the container. The container can also include a frame, a floor, and a plurality of fabric sides. The hoist can be removed from the container. In other words the hoist can include a cable or other connecting member that has a releasable end. A releasable hook can be attached to a free end of the hoist. The hoist can be operated manually or electrically in the various embodiments. The container, in some embodiments, can be mounted to a vehicle. The rail system is used to move the container from a first storage position to a second storage position, or from a first storage position to a position over a vehicle. Some embodiments of the storage system also include a second container. The rail system can then be employed to switch the storage position of the first container with the storage position of the second. In one embodiment, the rail system is adapted to be mounted to a ceiling. The system can be used anywhere, such as in the front of a garage forward of the passenger compartment of most vehicles when parked therein. In one embodiment, the apparatus for supporting the container which interacts with the rail system includes at least one roller or at least one wheel that interacts with the rail system. In another embodiment, the container includes a material that interacts with a vehicle. For example, a material that won't harm the finish on a vehicle and one that will support a load can be attached to the container so that the storage container can be moved to a position over a vehicle and lowered onto the vehicle. The container can also include a vehicle attachment mechanism formed integral to the container. The vehicle attachment mechanism can be straps, in one embodiment. In other embodiments, the attachment mechanism can include hardware for attaching to a vehicle. In one embodiment, the storage container converts into a car top carrier or other vehicle carrying device.

In one embodiment, the container further includes a foldable frame, a plurality of fabric sides attached to the frame, and a stiffening element for stiffening at least two opposing sides of the frame. The stiffening element is sized for insertion between at least some of the frame elements. The stiffening element is foldable and further includes a first substantially solid sidewall, and a second substantially solid sidewall. The stiffening element is insertable within the foldable frame, and unfolded to form a substantially noncollapsible container. In one embodiment, the stiffening element is foldable and further comprises a substantially solid floor. The stiffening element is insertable within the foldable frame and unfolded to form a substantially noncollapsible container.

A storage container includes a frame, a floor positioned within the frame, and a plurality of side flaps that cover the frame to form an inner compartment. The storage container further includes an apparatus for supporting the container which includes at least one roller, and a hoist attached between the first support apparatus and the frame. The hoist allows the frame and the container formed to move with respect the support apparatus. The hoist moves the frame and container up and down, in one embodiment. The storage container is stored near the ceiling or top of a room in a residence, a garage, or a warehouse. In one embodiment, the floor of the container is comprised of a plurality of plank members. In one embodiment, the plank members interlock. The plurality of side flaps are made of cloth or canvas. In some embodiments, flaps are formed which are further comprised of straps. Some embodiments of the container include a vehicle interface attached to the container. The vehicle interface is attachable to the vehicle via at least one vehicle attachment device. In this way a container could be used as a car top carrier.

A storage container system includes a frame, a floor portion positioned within the frame, and a plurality of side flaps that cover the frame to form an inner compartment. At least two side flaps include a substantially solid wall. The frame and sideflaps are foldable to a substantially flat position. The storage container system also includes an insert. The insert further includes a floor portion, a first stiffener for a sideflap located on one edge of the floor portion, and a second stiffener for a second sideflap located parallel to the one edge of the floor portion. The insert is insertable into the frame and unfoldable to a position where the first stiffener and the second stiffener stiffen a pair of the plurality of sidewalls to form a substantially solid container. The storage container also includes an apparatus for supporting the container from an overhead track. The apparatus allows the container to be moved to a plurality of positions along the overhead track. The floor portion of the container could be associated with the frame and the floor portion associated with the insert includes a floor stiffener.

It should be noted that the storage container discussed above is suspended from the ceiling in a garage and that this is not the only use contemplated. The storage container could be used in various rooms of a house, for example. The storage container could be used in a mud room, utility room, crawl space or other storage area in a residential dwelling. It is also contemplated that this system could also be used in commercial settings as well. Applications could be used in factories, offsite storage facilities, and the like. Even when a consumer rents offsite storage, a garage or other storage bin could be outfitted with such a system for more and better storage.

The storage container, as discussed above, is soft-sided. This means any container having a relatively soft side when compared to the floor. Canvas, leather, thin plastic and the like are thought of as being soft-sided.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A storage system comprising:
    a rail system having a plurality of storage positions and a raising and lowering position; and
    a first container having an inner compartment, the storage system further comprising:
        an apparatus for supporting the first container and a second container which also interacts the rail system;
        a hoist coupled to the apparatus for supporting the first container and the second container, the hoist allowing one of the first or second containers to be controllably positioned with respect to the apparatus for supporting the container, the rail system allowing either of the first and second containers to be moved from any one of the plurality of storage positions to the raising and lowering position.

2. The storage system of claim 1 wherein the container further comprises:
    a frame;
    a floor; and
    a plurality of fabric sides.

3. The storage system of claim 1 wherein the hoist can be removed from the container.

4. The storage system of claim 1 wherein the container can be mounted to a vehicle.

5. The storage system of claim 1 wherein the rail system is used to move the container from a first storage position to a second storage position.

6. The storage system of claim 1 wherein the rail system is used to move the container from a first storage position to a position over a vehicle.

7. The storage system of claim 1 wherein the storage position of the first container can be switched with the storage position of the second container using the rail system.

8. The storage system of claim 1 wherein the rail system is adapted to be mounted to a ceiling.

9. The storage system of claim 1 wherein the apparatus for supporting the container which interacts with the rail system further comprises at least one roller.

10. The storage system of claim 1 wherein the apparatus for supporting the container which interacts with the rail system further comprises at least one wheel that interacts with the rail system.

11. The storage system of claim 1 wherein the container includes a material that interacts with a vehicle.

12. The storage system of claim 11 wherein the container further includes a vehicle attachment mechanism formed integral to the container.

13. The storage system of claim 1 wherein the container further comprises:
    a foldable frame;
    a plurality of fabric sides attached to the frame; and
    a stiffening element for stiffening at least two opposing sides of the frame, the element sized for insertion between at least some of the frame elements.

14. The storage system of claim 13 wherein the stiffening element is foldable and further comprises:
    a first substantially solid sidewall; and
    a second substantially solid sidewall, the stiffening element insertable within the foldable frame and unfolded to form a substantially noncollapsible container.

15. The storage system of claim 13 wherein the stiffening element is foldable and further comprises:
    a first substantially solid sidewall;
    a second substantially solid sidewall; and
    a substantially solid floor, the stiffening element insertable within the foldable frame and unfolded to form a substantially noncollapsible container.

16. A storage container comprising:
    a frame;
    a floor positioned within the frame;
    a plurality of side flaps that cover the frame to form an inner compartment;
    a plurality of buckles that hold the plurality of side flaps together to form the storage container;
    an apparatus for supporting the container which includes at least one roller;
    a hoist attached between the first support apparatus and the frame, the hoist allowing the frame to move with respect the support apparatus; and a rail system having a plurality of storage positions and a raising and lowering position, wherein the rail system allows the container to be moved from any one of the plurality of storage positions to the raising and lowering position.

17. The storage container of claim 16 wherein the floor is comprised of a plurality of plank members.

18. The storage container of claim 16 wherein the floor is comprised of a plurality of interlocking plank members.

19. The storage container of claim 16 wherein the plurality of side flaps are made of cloth.

20. The storage container of claim 16 wherein flaps further comprise straps.

21. The storage container of claim 16 further comprising:
    a vehicle interface attached to the container; and
    at least one vehicle attachment device attached to the container.

22. A storage container system comprising:
    a frame;
    a floor portion positioned within the frame;
    a plurality of side flaps that cover the frame to form an inner compartment, at least two side flaps including a substantially solid wall, the frame and sideflaps foldable to a substantially flat position;
    an insert that further includes:
        a floor portion;
        a first stiffener for a sideflap located on one edge of the floor portion; and
        a second stiffener for a second sideflap located parallel to the one edge of the floor portion, the insert insertable into the frame and unfoldable to a position where the first stiffener and the second stiffener stiffen a pair of the plurality of sidewalls to form a substantially solid container; and an apparatus supporting the container from an overhead track having a plurality of storage positions and a raising and lowering position, wherein the apparatus allows the container to be moved from any one of the plurality of storage positions to the raising and lower position.

23. The storage container system of claim 22 wherein one of the floor portion associated with the frame and the floor portion associated with the insert includes a floor stiffener.

* * * * *